United States Patent [19]
Carson

[11] 3,914,134
[45] Oct. 21, 1975

[54] THROUGH-THE-PARTITION BATTERY CONNECTIONS

[75] Inventor: Charles Carson, Wyomissing, Pa.

[73] Assignee: General Battery Corporation, Reading, Pa.

[22] Filed: Aug. 1, 1974

[21] Appl. No.: 493,672

[52] U.S. Cl. .............................. 136/134 R; 136/176
[51] Int. Cl. ........................................... H01m 5/00
[58] Field of Search ..................... 136/134 R, 176

[56] References Cited
UNITED STATES PATENTS

| | | | |
|---|---|---|---|
| 1,377,995 | 5/1921 | Willard | 136/134 R |
| 1,758,506 | 5/1930 | Ford | 136/134 R |
| 3,388,005 | 6/1968 | Hahn et al. | 136/134 R |
| 3,468,720 | 9/1969 | Jensen | 136/134 R |
| 3,764,393 | 10/1973 | Fujimoto | 136/134 R |

*Primary Examiner*—Donald L. Walton
*Attorney, Agent, or Firm*—Bowie, Benasutti and Preston

[57] ABSTRACT

Copper cored intercell connecting elements which pass through cell partitions are welded on either side to upwardly depending posts from plate connector straps. The connector portion has a flange on one side of the partition and threading through to the other side, on which a washer-nut is tightened. Sealant is supplied in and around the cavity between the flange, the partition, and the washer-nut by means of a channel down through the partition from the top thereof.

8 Claims, 5 Drawing Figures

THROUGH-THE-PARTITION BATTERY CONNECTIONS

BACKGROUND OF THE INVENTION

This invention relates to the fabrication of storage batteries. More particularly, it relates to through-the-partition lead-acid batteries, and methods for fabricating the same.

In conventional battery configurations, a casing defines a plurality of cells separated by partitions, each cell having alternate interleaved positive and negative plates. These plates are so connected such that the positive plates from one cell are connected with the negative plates from the other cell, and so on, such that an electrical series connection results, with the total battery representing the series aggregation of the individual cells. Each of the cells is filled with electrolyte, and the battery itself is coupled to external apparatus by terminal posts, typically at the outside of the end cells.

One general problem encountered in the fabrication of the batteries relates to the most desirable methods for interconnecting plates of the respective cells. That is, it is desirable to arrange intercell connectors such that a minimum length electrical path is presented, but which is completely sealed such that electrolyte may not pass between the cells. The short electrical path is desirable for at least two reasons, a first relating to minimizing electrical resistance loss through the conductor, and a second relating to economy resulting from use of minimum conductor materials. In all cases, in order to facilitate production effectiveness and economy, the configuration of the cell to cell interconnection should be amenable to mass production methods while having minimum degradation effect on quality control. Also, the intercell connections should be sealed as completely as possible.

In accordance with the foregoing general constraints involved in lead-acid battery manufacture and design, many different intercell configurations have been proposed. Among these, one common variety is the up-and-over configuration, wherein the plate connecting straps in successive cells are coupled to one another by means of upwardly running elements which meet at a level in the top of or above the partition wall, often within the battery top itself. Such a configuration of course requires considerable materials, and involves a correspondingly long conduction path between cells. Typically also, construction methods for up-and-over configurations are not economical of time, effort, or material. Other intercell connection configurations involve extension of the plate lugs outside the batteries, either through the top, sides, or bottom, and interconnection there. Many of those designs present excellent structural and functional characteristics, but their unconventional configuration renders them unsuitable for certain applications. Also, depending on the type of battery being fabricated, outside-the-battery connections may entail undesirable processing steps.

One of the most common, and most often used classes of battery interconnection structure involves a through-the-partition connection. Typically, batteries of this class feature openings in the partition at or below the electrolyte level, with short cell-to-cell connectors penetrating the partition and sealed thereto by some appropriate mechanism. Due to the location of the connector relative to the electrolyte level, many proposals have been rendered, none of which are believed entirely adequate for the intercell seal in such through-the-partition cell-to-cell connections. For example, in U.S. Pat. No. 1,758,506 to B. Ford, a screw type interconnection was suggested wherein the connector has a flange on one side, threading through the partition opening to the other, and a lead washer tightened on the side opposite the flange. U.S. Pat. No. 3,764,393 to Fujimoto sets forth batteries wherein synthetic resin moldings surround the connecting conductor and interlock with connector flanges on either side and are bonded to the partition itself. Likewise, other patents have suggested totally encapsulating the cell-to-cell partition by means of molding some resin type material around the partition intersection. In each case, however, at least some difficulties are involved relative either to structure or to manufacturing efficiency. That is, in spite of the large variety of through-the-partition configurations shown in the prior art, none are seen to be entirely adequate from the standpoints of minimal conductor length, minimal electrical loss, perfect sealing at the partition juncture, and economy and efficiency of manufacturing process.

It is accordingly a primary object of the present invention to provide a battery cell configuration, and methods of achieving the same, whereby all of the foregoing design goals are realized in a through-the-partition configuration without compromise to one another.

SUMMARY OF THE INVENTION

The present invention involves battery apparatus, and methods for fabricating the same, wherein a plurality of individual structural features are combined to yield a configuration which substantially improves upon the prior art. First, a screw type connection is provided such that one or more intercell connectors may be mounted on the partition wall prior to weldment to the respective plate-strap posts. Second, a screw-on washer-nut and a corresponding spacer are placed on either side of the wall to form a cavity both around the connector and where it penetrates the partition wall. For purposes of increased conductivity, the connectors are made up of a copper core material. For purposes of sealing, channels are formed down through the partition from the top to the cavity around the connector. Through the channel, by means such as injection, a hardenable liquid sealant is inserted to fill the cavity and seal the connector at the point where it penetrates the partition. The aggregation of these separate features results in an overall configuration which is economical of materials, has excellent electrical properties, provides a superior cell-to-cell seal, and is readily amenable to efficient mass production techniques.

DETAILED DESCRIPTION

Figure 1:
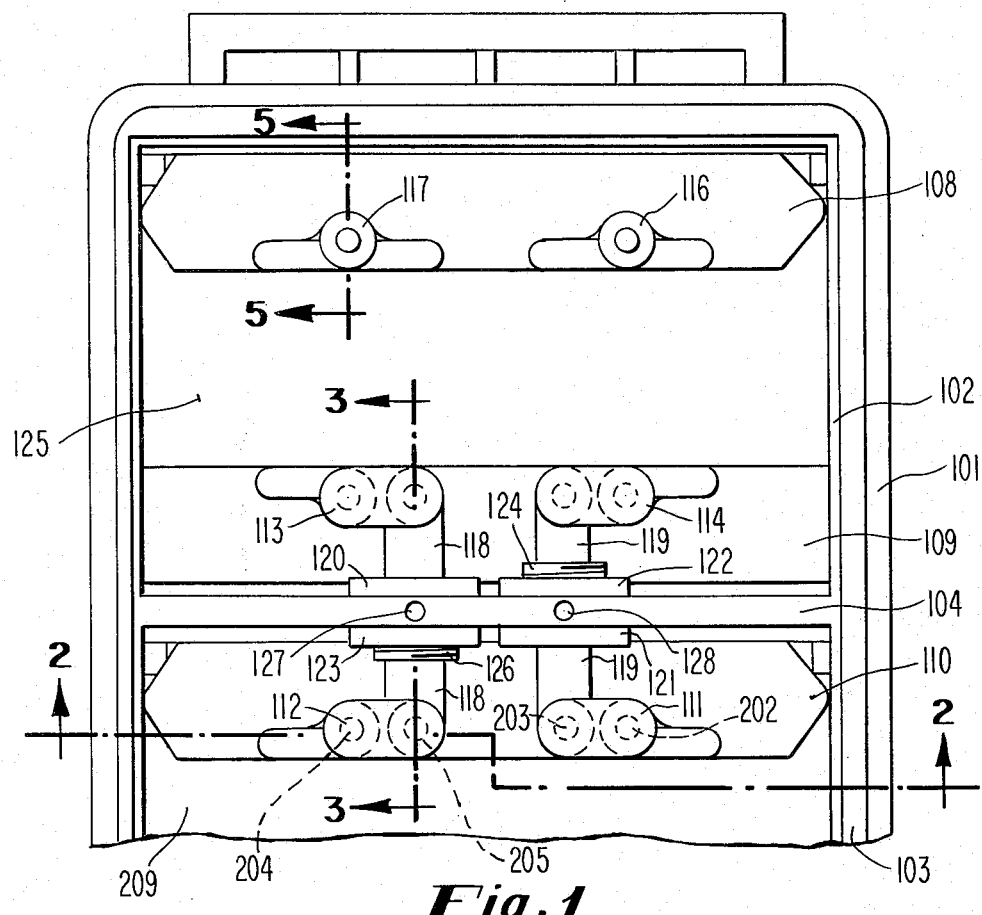
FIG. 1 shows a partial top view of a battery incorporating the principles of the present invention.

In the figures, a battery casing 101 of conventional composition and structure is divided into a plurality of cells by integral partitions such as 104. A depressed shelf 102 is provided around the walls of the casing 101, at the level of the partitions such as 104, for receipt of a cover at location 201. In each of the cells are a plurality of alternately arrayed positive and negative plates which form electrodes for the batteries. Plates are represented symbolically in FIG. 1, and in more accurate detail as plates 206 and 207 in FIG. 2, 301 and 302 in FIG. 3, and 501 in FIG. 5. Separating the plates are spacers such as 208 and 307 with separator protectors 125 and 209 composed of appropriate nonconductive materials, as is well known in the art. As the plates are alternately arrayed in the cells, the respective positive and negative plates are connected by straps such as 108, 109, and 110 at opposite ends of the cell. Typically, this connection is accomplished by means of lugs such as 303 and 304 which are upstanding from plates such as 302 and 301. In a given cell, all negative plates have the lugs upstanding at one partition wall, and all positive plates have the lugs upstanding at the opposite wall. Thereupon, strap elements such as 108, 109 and 110 are secured, generally by weldment, to the upstanding lugs of the plates at 306. Because the orientation of the positive and negative plates alternates from cell to cell, an electrical series connection results when intercell connectors are affixed between the straps. Therefore, the end cells such as the one shown entirely in FIG. 1 feature upwardly depending terminal elements such as 116 and 117 from the end connector strap 108.

One feature of the principles of the present invention which serves to increase electrical conductivity, thereby improving efficiency, are copper cores bonded by casting techniques within both the lead-alloy connector elements and the upstanding posts on the straps. For ease of bonding the copper cores to the connector elements, the cores are initially electroplated with a 0.0005 inch deposit of 50 percent tin-50 percent lead alloy. As a consequency thereof, the current bearing capacity of the connectors is enhanced to the point that large amounts of current are accommodated, such as are useful for diesel starting applications. These conductor portions are represented symbolically at 202, 203, 204, 205 and the like. Similarly, for the terminal post configurations, copper cores 517 and 504 are utilized.

In the embodiments of the present invention shown in the figures, the through-the-partition intercell connectors 118 and 119 are generally U-shaped in configuration, the top ends of the U being secured by weldment to corresponding upstanding post elements 111 through 113 from the straps 109 and 110 which in turn are connected to the lugs of the plates in the cells. The U-shaped configuration for the connectors, in combination with the upstanding posts from the straps, considerably facilitates production, in that the juncture of connector and post is above both the straps and the actual penetration of the partition, and thus is spacially distinct such that welding torches and the like may be easily lowered to the region of the juncture to secure the two together by weldment using appropriate fixtures. The aforementioned conduction-aiding copper cores 203 and 205 are similarly of U-shaped configuration.

On one side of the partition wall 104, intercell connectors 118 and 119 contain flanges such as 321 and 322. Rather than making direct contact with the partition wall, however, these flanges are spaced away from the partition wall by annular spacers such as 120 and 121 which are L-shaped in cross section and surround the exterior periphery of the flanges forming gaskets between the flanges and the partition wall 104 through which the connectors pass.

From the flanges 321 and 322 through to the other side of the connector 118 and 199 are threaded portions 124 and 126, onto which, from the side of the partition wall 104 opposite the flanges and spacers, washer-nuts 122 and 123 are able to be tightened against the partition wall 104 in order to surround and secure the openings penetrated by the connectors. For example, when connector 118 is placed through the opening, and the nut 123 is tightened against the partition wall, the tight mechanical fit of the nut 123, spacer 120, and flange 322 together form cavity 305 in and around connector 118 where it penetrates the partition wall 104.

In accordance with the principles of the present invention, each of the partition walls has formed therein a channel from an opening in the top part of the partition wall downwardly through the partition to communicate with the opening from cell-to-cell for the intercell connectors. As may be seen from the drawings, the openings such as 127 and 128 in the top of the partition 104, from which the channels downwardly extend, are relatively small in comparison with the scale of the battery, and only serve the function of permitting the introduction of a liquid sealant material downwardly to fill the cavity formed by the flange, spacer, and screw-on washer-nut of the associated intercell connector. Thus, when the connectors are mechanically mounted on the partition wall by means of the nuts 122 and 123, a hardenable liquid sealant applied through channels 127 and 128 completely fills the cavity and surrounds the connector as it passes through the partition. When the sealant thusly applied hardens, a complete, liquid tight seal is produced at the point where the connectors penetrate the partition wall from cell-to-cell.

In preferred embodiments, spacers such as 120 and 121 and washer-nuts such as 122 and 123 are constituted of polypropylene, and the hardenable liquid sealant is a silica filled epoxy resin resistant to dilute sulfuric acid solutions. Clearly, the compositions of the various elements may be varied considerably in accordance with the knowledge of those of ordinary skill in the art, without departing from the spirit of the scope of the principles of the present invention.

Figure 2:
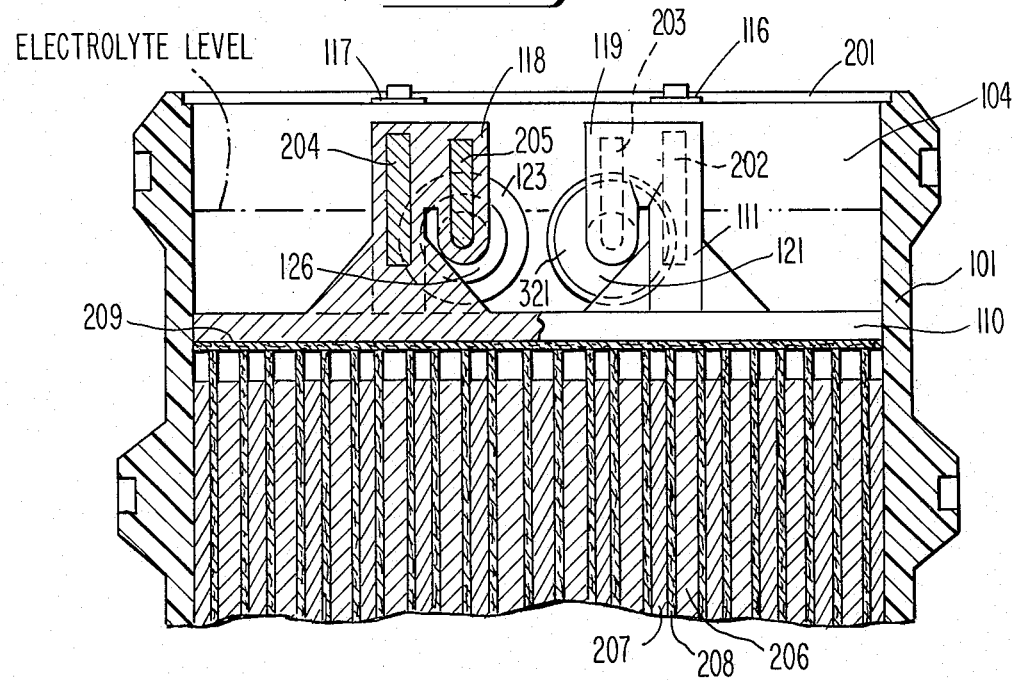
FIG. 2 shows a partial vertical cutaway of the FIG. 1 battery, section "2—2," on one side of the through-the-partition connection.
Figure 3:
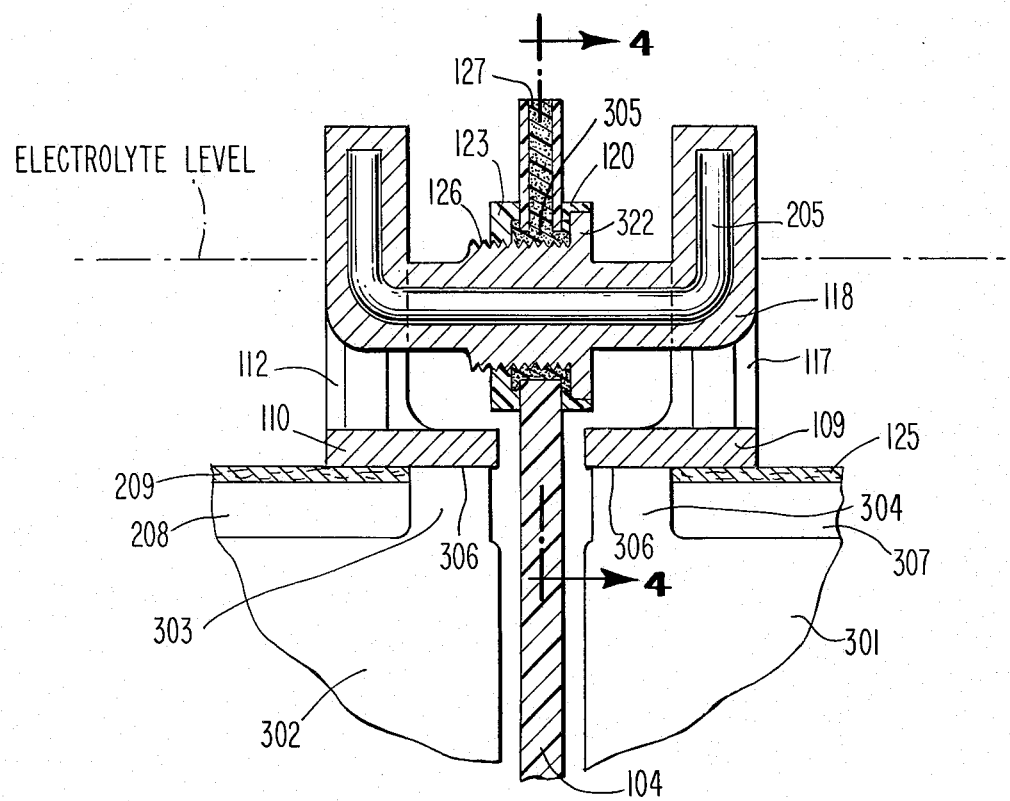
FIG. 3 shows a transverse section of the through-the-partition interconnection of FIG. 1, section "3—3," which embodies the principles of the present invention.
Figure 4:
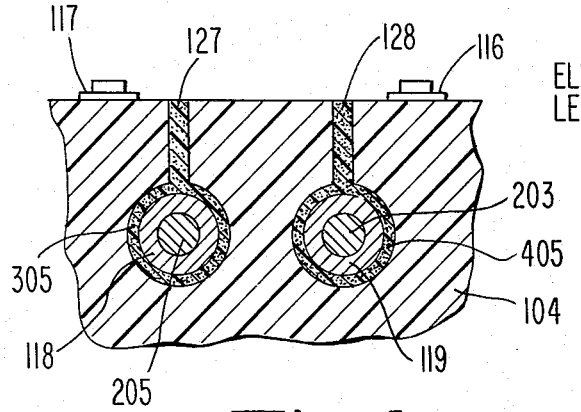
FIG. 4 shows a section diagram in the partition wall, section "4—4" of FIG. 3.

As may be further seen from FIGS. 1 and 2, the principles of the present invention may involve two connectors between succeeding cells on each side mainly for relatively large current supply applications of the battery. In FIGS. 1 and 2, connectors 118 and 119 both are electrically coupled to the associated lug connector straps 109 and 110. When such a configuration is utilized, it is preferable that the flanges be located on opposite sides of the partition wall 104 so that the oppositely directed washer-nuts 122 and 123 can achieve greater mechanical stability for the connector seals 305 and 405.

Figure 5:
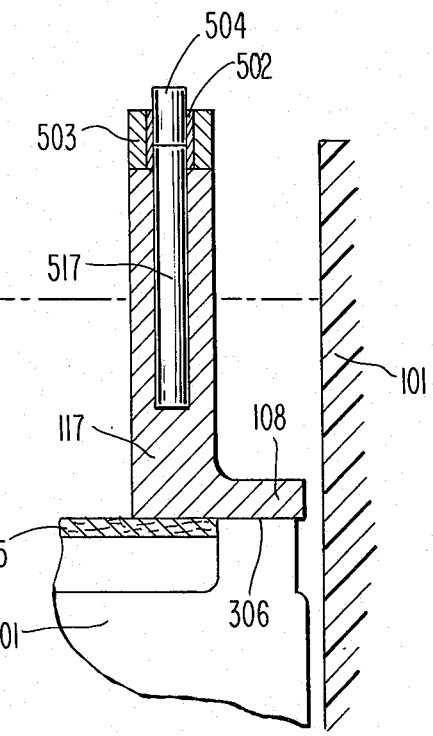
FIG. 5 shows a terminal post element for the battery, section "5—5" of FIG. 1.

FIG. 5 shows a battery terminal which may be utilized in conjunction with the principles of the present invention, wherein an end strap 108 connected to lugs, such as of plate 501, includes upwardly depending terminal posts 116 and 117, each of which has a central copper core such as 517. At the top of the post, for purposes of extending it to easily accommodate other internal battery designs, and the like, additional alloy 503 similar to that used in items 116 and 117 may be introduced with an additional section of copper rod 504 inserted therein and supported by copper tube 502.

In summary, FIGS. 1 through 5 portray a battery having through-the-partition intercell connectors of relatively simple construction in which the current carrying capacity is superior. Moreover, the configuration set forth is also amenable to economical and efficient production techniques.

In a preferred method for assembling a battery as set forth, the casing with partitions is assembled, the partition walls having openings for the intercell connectors to pass therethrough, and channels from the top of the partition wall down to and communicating with the connector openings. Positive and negative plates, with spacers therebetween, are inserted as desired into the various cells, and lug connector straps are secured thereto, as by weldment. Each of the intercell connectors is then provided with a spacer for the flange side of the partition wall, and the connectors are respectively mounted onto the partition walls, through the openings, with the associated washer-nut tightened thereto. At such time, the intercell connectors may be first secured by weldment to the upstanding posts from the associated lug connector straps, and then the hardenable sealant fluid may be injected through the channels to surround and seal the connector as it passes through the partition wall. Once the intercell connectors are secured in place in accordance with the principles of the present invention, the remaining conventional battery fabrication steps may be employed, including mounting of a top onto the casing in accordance with any of the standard approaches well known in the art.

In summary, apparatus embodying the principles of the present invention is amenable to high efficiency, mass production techniques. With respect both to methods and apparatus involving the principles of the present invention as set forth herein, it is to be understood that alternative approaches will readily occur to those of ordinary skill in the art without departing from the spirit or the scope hereof.

I claim:

1. A storage battery comprising:
a casing having a plurality of cell cavities defined by the walls of said casing and integral partition walls therein, said cell cavities being configured for containment of battery electrode plates and electrolyte fluid, said partition walls each defining at least one opening between partitions and above the tops of said plates for passage through the partition wall of intercell connectors, said openings each communicating with the tops of their respective partition walls by means of a channel in the partition wall;
conductive straps respectively connecting the positive plates of a cell on the side of a first partition wall and the negative plates of a cell on the side of the same cell opposite said first partition wall, the orientation of said straps alternating from cell to cell facilitate series connection of cells, said straps each including at least one upward post element extending above associated openings, for connection with intercell connectors;
at least one intercell connector between associated post elements on either side of a partition wall, said connector having downwardly depending end portions from the tops of the post elements and an integral central portion through the opening in the partition, said connector incorporating a flange on one side of the partition wider than the associated opening and a threaded portion from said flange through the associated opening to the opposite side of the associated partition wall;
a spacer between said flange and the associated partition wall;
a washer-nut, wider than the associated opening, tightened on said threaded portion against the partition wall on the side opposite said flange; and
a sealant applied through said channel to fill a void around the central portion of said connector formed by said flanges, said spacer, and said nut.

2. A battery as defined in claim 1 wherein said post elements and said intercell connector are formed of an outer lead portion and an inner copper core.

3. A battery as defined in claim 1 wherein each of said partitions defines two openings and each of said straps includes two post elements, and wherein two connectors connect respectively associated posts of associated straps, the flange portions of said two connectors being located on opposite sides of the associated partition walls.

4. A battery as defined in claim 3 wherein said connectors are at least partially immersed in electrolyte fluid.

5. A battery as defined in claim 4 wherein the connection of said connectors to the tops of said post elements is disposed above said electrolyte level, but at least a portion of said central portion of said connectors is below said electrolyte level.

6. A battery as defined in claim 5 wherein said post elements are offset on said straps away from said openings, a weldment between said post elements and said connectors constituting an offset connection in regard to said opening.

7. A method of fabricating batteries comprising the steps of:
providing a casing having a plurality of cells separated by partition walls;
forming openings in said walls to accommodate intercell connectors;
forming channels in said partition walls from the top thereof downwardly into said openings;
providing electrode plates and spacers in said cells;
electrically connecting plates of the same polarity at opposite ends of the cells, plates of alternate cells being connected in opposite fashion to one another for series interconnection of the cells, said connection being made with conductive straps having upward post elements for intercell connectors;
penetrating each of said openings with an intercell connector element having a flange on one side and a threaded portion through to the other side, said element being provided with a spacer between said flange and the partition wall;
tightening a washer-nut on said threaded portion to surround the opening and the element penetrating therethrough by a cavity formed by said spacer, said flange, and said nut;

securing said connector to associated post elements by weldment; and injecting liquid, self hardening sealant through said channel to fill said cavity and thereby to seal the intercell connection.

8. A method as described in claim 7 wherein said first named forming step includes forming two openings in the partition walls, said second named forming step includes forming corresponding channels for each of said openings, and said penetrating step includes positioning two of said connector elements through said two openings with their respective flange portions located on opposite sides of the associated partition wall.

* * * * *